(12) United States Patent
Flint et al.

(10) Patent No.: US 10,897,313 B2
(45) Date of Patent: Jan. 19, 2021

(54) APPARATUS AND METHOD FOR REDUCING DISTORTION OF AN OPTICAL SIGNAL

(71) Applicant: Leonardo MW Ltd., Essex (GB)

(72) Inventors: Ian Flint, Essex (GB); Mohammed Alom, Essex (GB); Shyqyri Haxha, Essex (GB)

(73) Assignee: LEONARDO MW LTD, Basildon (GB)

( * ) Notice: Subject to any disclaimer, the term of this patent is extended or adjusted under 35 U.S.C. 154(b) by 0 days.

(21) Appl. No.: 16/757,092

(22) PCT Filed: Oct. 18, 2018

(86) PCT No.: PCT/EP2018/078662
§ 371 (c)(1),
(2) Date: Apr. 17, 2020

(87) PCT Pub. No.: WO2019/077090
PCT Pub. Date: Apr. 25, 2019

(65) Prior Publication Data
US 2020/0252134 A1 Aug. 6, 2020

(30) Foreign Application Priority Data
Oct. 18, 2017 (GB) .................................. 1717084.6

(51) Int. Cl.
*H04B 10/00* (2013.01)
*H04B 10/588* (2013.01)
(Continued)

(52) U.S. Cl.
CPC ....... *H04B 10/588* (2013.01); *H04B 10/2537* (2013.01); *H04B 2210/006* (2013.01)

(58) Field of Classification Search
CPC ............ H04B 10/2507; H04B 10/2537; H04B 10/58; H04B 2210/006
See application file for complete search history.

(56) References Cited

U.S. PATENT DOCUMENTS

| 2002/0048061 A1 | 4/2002 | Glingener et al. |
| 2008/0139784 A1 | 6/2008 | Hazra et al. |
| (Continued) | | |

OTHER PUBLICATIONS

International Search Report (PCT/ISA/210) and Written Opinion (PCT/ISA/237) dated Feb. 12, 2019, by the European Patent Office as the International Searching Authority for International Application No. PCT/EP2018/078662.
(Continued)

*Primary Examiner* — Daniel G Dobson
(74) *Attorney, Agent, or Firm* — Buchanan Ingersoll & Rooney PC (57) ABSTRACT

An RF signal to be carried by an optical link is modulated onto two optical beams. The modulators are tuned differently so that the distortion products carried on one beam are relatively larger compared to the fundamental compared with other beam. One of the beams is optically upconverted by the appropriate Brillouin shift frequency and the two beams counter-propagated through an optical waveguide in order to create a Brillouin grating. The grating acts to separate the distortion products from the fundamental so as to provide at an output of the link a signal in which the distortion products are insignificant is not absent.

26 Claims, 5 Drawing Sheets

(51) Int. Cl.
*H04B 10/2537* (2013.01)
*H04J 14/00* (2006.01)

(56) References Cited

U.S. PATENT DOCUMENTS

| | | | |
|---|---|---|---|
| 2008/0144987 A1 | 6/2008 | Tanaka | |
| 2018/0173022 A1* | 6/2018 | Marpaung | H04B 10/5165 |
| 2019/0326990 A1* | 10/2019 | Middleton | G02F 1/0123 |

OTHER PUBLICATIONS

Sancho, et al., "Dynamic Microwave Photonic Filter Using Separate Carrier Tuning Based on Stimulated Brillouin Scattering in Fibers", IEEE Photonics Technology Letters, Dec. 2010, vol. 22, No. 23, pp. 1753-1755.

* cited by examiner

APPARATUS AND METHOD FOR REDUCING DISTORTION OF AN OPTICAL SIGNAL

The invention relates generally to apparatus and method for reducing distortion in an optical signal. The invention was conceived for photonic links used with ultra wide band photonic radio frequency receivers (RF) in electronic warfare (EW) systems, though the invention may have other applications such as for removing distortion in long-haul telecommunication cables.

Current non-photonic EW receivers using RF filtering have a typical dynamic range in the mid 50s dB. Photonic RF links achieve a slightly better dynamic range for the same frequency range and bandwidth without filtering. Photonic RF links therefore provide a promising route for providing improved dynamic range for EW receivers.

The dynamic range of a photonic RF signal is limited by the amount of optical modulation (typical 4%) that can be applied by a modulator modulating the optical beam to carry a received RF signal before distortion products derived through the modulation process begin to dominate. An object of the invention is to improve the dynamic range of the photonic RF signal.

Brillouin scattering is a form of inelastic optical light scattering arising from optical inhomogeneity within the light carrying medium. Thermal motion of molecules inside the optical medium cause local density fluctuations that lead to formation of acoustic vibrations within the optical material. Such waves represent acoustic phonons. The interaction of incident light with these phonons results in Brillouin scattering.

Spontaneous Brillouin scattering is caused by natural thermal fluctuations within the optical medium. However, when the intensity of a light beam propagated through the medium is sufficiently high, variations in the electric field of the light beam can induce acoustic vibrations within the material. Scattering caused by these induced acoustic waves is known as Stimulated Brillouin scattering (SBS).

The change in optical frequency of scattered light from the frequency of the incident beam is called a Stokes shift. Scattered light that is shifted to lower frequencies are denoted as stokes components and light scattered to higher frequencies as anti-Stokes components.

The Stokes shift of Brillouin scattered light (Brillouin shift) is equal to the frequency of the acoustic wave within the optical material. In silica optical fibres the typical value of the stokes shift of Brillouin scattered light from incident light having a wavelength of ~1.55 um, is 10.8 GHz. This is a result of the acoustic velocity in silica (V=5900 m/s) and refractive index n=1.46 of silica.

In an application of SBS, a first weak beam carrying a signal is propagated through an optical material in a first direction and a second light beam of optical power sufficient to effect SBS is propagated through the optical material in an opposite direction. By arranging the counter propagating beams to be appropriately polarised, and with frequencies separated by the Brillouin shift for the optical medium, the Dynamic Brillouin grating that is formed acts to reflect a portion of the signal back towards the first beam source.

Further information describing the generation of Dynamic Brillouin gratings and the principles behind it can be found in Generation and Application of Dynamic Grating in Optical Fibres using Stimulated Brillouin Scattering; Nikolay Primerov; Thesis No. 5615 (2013); Ecole Polytechnique Federale De Lausanna, which is incorporated herein in its entirety by reference.

In a first aspect, there is provided apparatus for reducing distortion in an optical signal, the apparatus comprising: a coherent light source; an optical waveguide; an input for receiving a signal (e.g. a RF signal (e.g. EW signal) from a RF receiver); means for generating a first coherent light beam modulated to carry a signal received at the input, a means for generating a second coherent light beam modulated to carry the signal received at the input; the optical frequency of the first light beam and second light beam differing to satisfy the Brillouin condition; and in which the first and second light beams have different fundamental to distortion product ratios; the apparatus arranged such that the first coherent light beam propagates along the optical waveguide in a first direction and the second light beam propagates along the optical waveguide in an opposite direction to generate a dynamic Brillouin grating in the optical waveguide through stimulated Brillouin scattering.

Because the first and second beams have different fundamental:distortion product ratios (namely the ratio of amplitude of the fundamental to amplitude of largest amplitude distortion product) the dynamic Brillouin grating will act to preferentially reflect one of the fundamental or the distortion products in the signal over the other. Depending on the chosen arrangement of the apparatus, either the beam transmitted through the grating or that reflected from the grating will have reduced RF distortion products compared with modulated light beam before incidence with the grating. The apparatus may therefore include an electro-optical transducer arranged to receive the output beam from the grating carrying the signal with the reduced distortion RF distortion products.

As such the apparatus provides an efficient means of reducing or removing distortion products introduced through the process of modulating the light to carry the signal, providing an output signal having higher spectrally free dynamic range compared with existing optical and electronic linkages used with RF receivers.

The second beam may be of sufficient optical power to bring about stimulated Brillouin scattering in order to form the grating. The second beam may be of higher optical power than the first beam. The apparatus may comprise an optical receiver arranged to receive the portion of the first light beam that has propagated through the grating. Alternatively, the optical receiver may be arranged to receive the portion of the first light beam that has reflected from the grating.

In one arrangement the second beam has a higher frequency (shorter wavelength) than the first beam (e.g. through upconverting the second beam) by a magnitude substantially equal to the antistokes frequency shift the second beam may have a smaller fundamental to distortion product ratio than the first beam, and the optical receiver may be arranged to receive the portion of first light beam transmitted through the grating, i.e. travelling in the direction of the first beam.

Alternatively, though less preferred, the second beam may have a lower frequency than the first beam (e.g. through down converting) by the stokes frequency shift, the second beam may have a smaller fundamental:distortion ratio than the first beam, and the optical receiver maybe arranged to receive the portion of the first beam that is scattered (reflected) by the grating, i.e. travelling in the opposite direction to the first beam. A perceived disadvantage of the second arrangement is that spontaneous Brillouin Scattering may reduce the quality of the output.

Because the amplitude of the distortion products in the output optical signal from the grating are substantially reduced compared with the fundamental, and preferably such that amplitudes of the largest distortion products are below the noise floor, the optical modulator can be set to operate at a higher modulator index (optionally near 100%), thereby improving signal to noise ratio of the output signal.

The apparatus may be used as an optical link for a RF receiver. In such an embodiment, the amplifier of the RF receiver used to amplifier the signal fed to the optical modulator will typically produce at least some distortion products that align with the distortion products created during optical modulation. As such the apparatus will further advantageously act to reduce/substantially remove distortion products derived from the amplifier in the electrical domain as well as from the optical modulator.

The apparatus may comprise a coherent light source with a first modulator to modulate the coherent light from the light source to provide the first light beam.

The apparatus may comprise a second modulator arranged to modulate coherent light (e.g. a portion of the coherent light from the coherent light source, in which case the apparatus may further include a splitter) to generate the second modulated light beam.

Alternatively the second modulated light beam could be generated by a modulated coherent light source.

In order that the second light beam has a lower ratio of fundamental:distortion product, the second modulator may be detuned compared with the first modulator. The second modulator may be tuned to substantially $\pi$.

Given that dynamic range depends on the square of the modulation depth, the apparatus is expected to be capable of providing an increase in dynamic range up to 28 dB over current systems which typically use 4% modulation depth.

Because both the first and second beams are modulated to carry the signal, the grating will auto align with the changing signal (e.g. EW spectrum) to remove the changing frequencies of the distortion products.

Because the first and second beams will typically be modulated separately, the relative sizes of different distortion products in the first beam may differ from the relative sizes of distortion products in the second beam. The apparatus may comprise an amplifier arranged to amplify the second beam. This allows the gain of the second beam to be adjusted to control the strength of the grating in order to suppress the largest distortion products in the first beam down below the noise floor. This may result in over suppressing of the relatively small distortion products though this has a very little deleterious effect on signal quality at least for EW applications, as the total width of all suppressed distortions products will be very narrow compared with the total observed bandwidth.

Depending on the attenuation of the fundamental at the output the grating, the apparatus may comprise an optical amplifier (e.g. EDFA type or other) to amplify the output signal.

The optical waveguide may comprise an optical fibre.

The size of the Brillouin shift required to construct the grating will depend upon the physical properties, e.g. acoustic velocity and refractive index of the optical waveguide material, stress in the waveguide and wavelength of the first and second beams. Where silica glass fibre is used as the waveguide material, a shift of between about 10 GHz to 11 GHz is likely to be required in order to satisfy the Brillouin condition. This may need to be adjusted if using a waveguide comprising material other than silica or in addition to silica. An example of a possible alternative to silica fibre is photonic crystal fibre that includes cavities which may hold material(s) with advantageous optical properties.

The optical power of the second beam may be traded against the length of the optical waveguide to reduce latency in the output signal. A more powerful second beam will allow a shorter waveguide to be used.

The optical light source and optical modulator may be provided, for example, by a separate light source and modulator or a single unit modulated light source.

The first and second light beams may be amplitude modulated to carry the signal. The first optical modulator may comprise an electro-optical modulator which may be a single sideband (SSB) modulator. The second optical modulator may comprise an electro-optical modulator which may be a single sideband modulation (SSB) modulator. The use of a SSB modulator circumvents the need to compensate for possible interference between two side bands.

Optionally the first and/or second modulators may comprise carrier suppressed single sideband modulators. This advantageously lowers the power of the beam into the optical receiver allowing better power handling and lowers the noise.

The coherent light source, e.g. a laser, may be arranged to output a coherent light having a wavelength C-band centred at substantially 1550 nm. This is preferred because many commercially available components are adapted to operate at this wavelength. However, the apparatus may in principle use first and second optical beams of other wavelengths falling within ultraviolet to terahertz range.

The apparatus may comprise an RF receiver, which may include an antenna and a RF amplifier, to drive one or both of the modulators. The RF receiver may be used to drive both modulators. The RF receiver may be a very broad band receiver, e.g. arranged to receive any EW signal within a bandwidth of 1 KHz-100 GHz favourably 3 KHz-100 GHz.

The apparatus may comprise an analogue-to-digital converter (ADC) arranged to receive an electrical output from the optical receiver.

As current ADCs only resolve up to a frequency of about 2 GHz to a desired fidelity, the apparatus may comprise means to down-convert the output from the grating to a frequency that the ADC can resolve.

In one arrangement, the apparatus may include an electronic mixer though more preferably a phonic converter, which offers less distortion, to down convert or up convert the output signal from the grating.

The apparatus may comprise a combiner (e.g. a polarisation combiner) arranged to combine the output beam from the grating with a third coherent light beam modulated by a SSB carrier suppressed modulator tuned with a local oscillator (lo). By tuning the local oscillator to a frequency shifted from a frequency of interest by a frequency within the operational bandwidth of the ADC, a beat signal is produced at the output of the optical receiver at a frequency that the ADC can resolve.

The invention may also be described in terms of a method and therefore in another aspect of the invention there is provided a method for reducing distortion in an optical signal, the method comprising:

modulating a first coherent light beam to carry a signal and propagating the modulated coherent light beam along an optical waveguide;

modulating a second coherent light beam to carry the signal and propagating the modulated coherent light beam along an optical waveguide;

generating a dynamic Brillouin grating in the optical waveguide using stimulated Brillouin scattering by propagating the second light beam through the optical waveguide in an opposite direction to the first light beam; the optical frequency of the first beam differing from the optical frequency of the second beam by an amount to satisfy the Brillouin condition;

and in which the first and second light beams are modulated so as to have different fundamental to distortion product ratios.

The second light beam may be modulated to have a lower fundamental-distortion production ratio than the first light beam; the second light beam may be up converted by the Brillouin shift, and that the used output is the portion of the first beam that has passed through the Brillouin grating. Alternatively, though less preferred, the second beam may be modulated to have a higher fundamental-distortion production ratio than the first light beam and down converted by the stokes shift.

The second beam may be modulated by a detuned optical modulator. For example the second beam is modulated by a optical modulator tune substantially to 7E.

The second light beam may be up converted by a frequency substantially equal to the stokes (Brillouin) shift for Brillouin scattering.

The second modulated beam may be amplified before being propagated through the optical waveguide. Amplification may occur subsequent to application of the stokes shift to the modulated second beam.

The second modulated beam may be amplified to at least a power necessary to reduce distortion products caused from optical distortion to a level below a noise floor.

The first light beam may be modulated by a single sideband (SSB) modulator.

The method may include splitting a coherent light beam to create the first and second coherent light beams.

The output may be converted to an electrical signal by an optical-electro transducer. An analogue to digital converter may be arranged to receive an output of the optical-electro transducer.

A third light beam may be modulated so as to impose thereon a frequency that is spaced from a frequency of interest by a separation frequency that lies within an operational bandwidth of the analogue to digital converter. The portion of the first beam that has passed through the Brillion grating is combined with the third beam; the optical electro transducer being arranged to receive the combined first and third beams.

In another aspect there is provided a method for reducing distortion in an optical signal of a photonic link between a RF receiver and a signal processor, the method comprising:

modulating a first coherent light beam to carry a signal received by the RF receiver and propagating the modulated coherent light beam along an optical waveguide;

modulating a second coherent light beam to carry the signal received by the RF receiver and propagating the modulated coherent light beam along an optical waveguide;

generating a dynamic Brillouin grating in the optical waveguide using stimulated Brillouin scattering by propagating the second light beam through the optical waveguide in an opposite direction to the first light beam; the optical frequency of the first beam differing from the optical frequency of the second beam by an amount to satisfy the Brillouin condition;

and in which the first and second light beams are modulated so as to have different fundamental to distortion product ratios.

Figure 1:
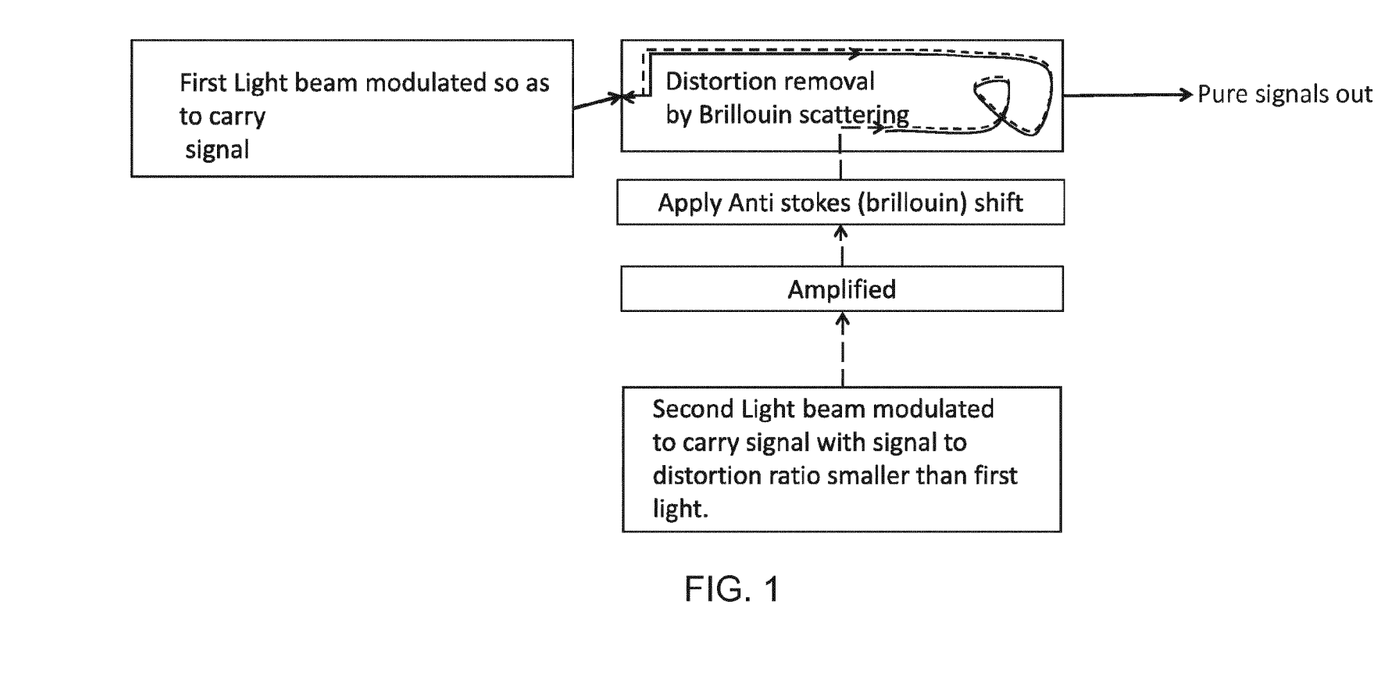
FIG. 1 is functional schematic of optical distortion removal mechanism.

The invention will now be described by way of example with reference to the following figures in which:

FIG. 1 illustrates functional schematic of distortion removal apparatus being part of an optical link for use with a RF receiver, e.g. a wide band receiver adapted to receive EW signals between 1 Khz-100 GHz.

A first light beam, imposed with both the fundamental and unwanted distortion products, is propagated through an optical waveguide in a first direction. A second light beam, imposed with both the fundamental and unwanted distortion products, is propagated through an optical waveguide in an opposite direction to the first beam. The ratio of the amplitude of fundamental to amplitude of largest distortion product is lower for the second beam than the equivalent ratio for the first light beam. In other words the amplitude of the distortion products relative to the fundamental are relatively larger in the second beam compared with the first beam. The second light beam is frequency shifted with respect that of the first beam by the antistoke frequency (Brillouin shift) for the waveguide material.

The second beam is of sufficient optical power to generate a dynamic SBS grating in the waveguide that acts to partially reflect the first beam back in the opposite direction.

Because the second beam has a lower ratio of fundamental to distortion products compared with the first beam, the grating preferentially reflects distortion products within the first beam over fundamental. As such the portion of the first light beam that passes through the grating has distortion products of reduced amplitude relative to fundamental compared with the first beam before incidence with the grating. In other words the output has a higher fundamental to distortion product ratio that than the first beam. The apparatus may include an optical-electric transducer arranged to receive the portion of the first beam transmitted through the grating.

If the second beam is of sufficient optical power the amplitude of all distortion products can be removed to below the noise floor such as to provide the output with a very high spectrally free dynamic range.

The optical power of the beam needed to generate a SBS grating will depend on the optical medium used, which can be straightforwardly determined through empirical experimentation. The polarization of first and second beams need to be suitable controlled to generate the grating. Such control is taught in Nikolay Primerov thesis mentioned above, but nevertheless will be known to those skilled in the art.

Figure 2:
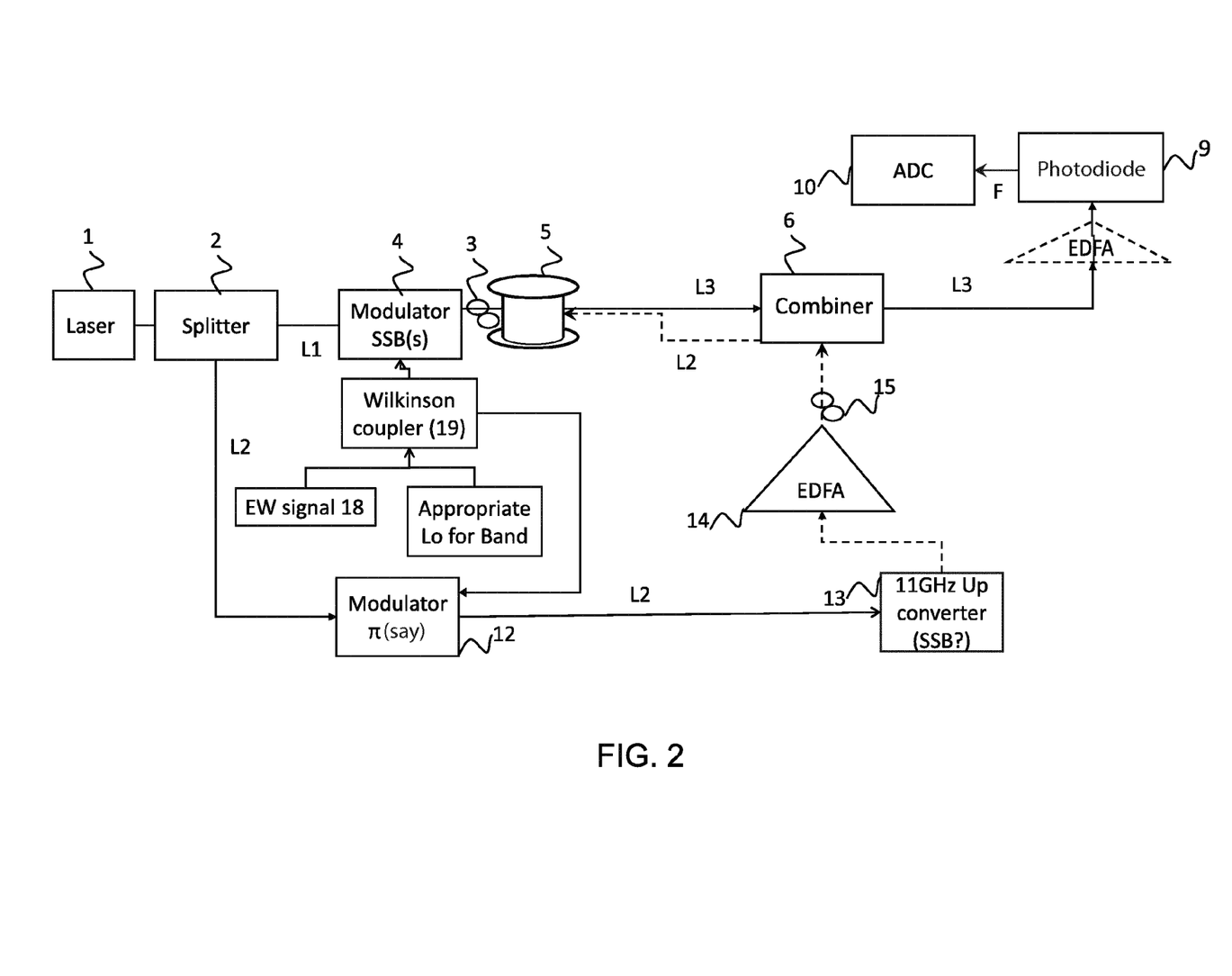
FIG. 2 is a schematic of a wide band RF photonic receiver comprising an optical link incorporating an optical distortion removal mechanism.

FIG. 2 is a schematic of an EW RF receiver and optical linkage that utilises the distortion removal apparatus of FIG. 1.

There is shown a laser 1, typically a distributed feedback laser, a first splitter 2, a polarisation controller 3, a single sideband carrier suppressed (SSB(C)) modulator 4, an optical medium 5 (typically a length of optical fibre—e.g. single mode fibre) in which a stimulated Brillion dynamic grating is produced; an optical combiner 6, a high frequency photodiode 9, an analogue digital converter 10 having an output for receipt by a digital EW system; a detuned modulator 12; a photonic upconverter 13 tuned to upconvert an input by an anti-stokes frequency; an optical amplifier (e.g. a EDFA); and a second polarisation controller 15.

The apparatus further includes an EW receiver 18 comprising a RF antenna and amplifier, and a wide band RF coupler 19.

An EW signal received by receiver 18 is combined through the wide band RF coupler 19, (e.g. a Wilkinson coupler) with a local oscillator (lo) tuned to ensure the photodiode 9 beats at a frequency that the ADC 10 can resolve. The output from the coupler 19 is used to drive modulators 4 and 12.

The laser 1 provides a coherent light beam, e.g. of a near-IR frequency, that is split by first splitter 2 into a first light beam L1 and a second light beam L2.

The first light beam L1 modulated by the SSB(C) modulator 4 and the second light beam L2 is modulated by the detuned modulator 12 such that both the first and third light beams L1 L2 carry EW signals fed from receiver 18.

Both the first and second modulators are optionally Mach Zehnder modulators. The first modulator is biased for high efficiently, e.g. to $\pi/2$.

The detuned modulator L2 is biased at 7E such that L2 has a smaller ratio of the amplitude of the fundamental:amplitude of largest distortion products is than L1.

The amplitude of the distortion products in L2 may still be smaller than the amplitude of the fundamental (though an amplitude larger than the fundamental would be preferable).

Modulated beam L2 is up converted by the antistokes frequency (typically ~11 GHz depending on the material(s) used to construct the optical fibre) and then amplified by optical amplifier (e.g. of EDFA type or other) 14.

The first beam L1 and second beam L2 are counter propagated through optical fibre 5. The second beam L2 is of sufficient power to incite a Brillouin grating within the optical fibre 5.

Polarisation controllers 3 and 15 are used to control the polarisation of L1 and L2 respectively such that Brillion grating occurs within the fibre 5 at the correct orientation to provide the desired reflection of L1. This technique will be familiar to those skilled in the art.

Because the ratio of the amplitude of the fundamental:distortion products in the second beam L2 is lower than the ratio of the amplitude of the fundamental to distortion products in first beam L1, the grating preferentially reflects the distortion products within L1 over the fundamental, meaning that output beam L3, being that part of L1 transmitted through grating in fibre 5, has a greater ratio of fundamental:distortion products than L1. L3 thus has a higher spectral free dynamic range than L1.

It will be appreciated that the amplitude of the distortions products in L2 need to be above a threshold level for the Brillouin grating to be effective at reflecting the distortion products carried by L1.

The optical power of L2 can be adjusted through control of amplifier 14. Favourably L2 is made to be sufficiently optically powerful to reduce all distortion products within L3 to below the noise floor.

By increasing the optical power of L2, the distortion products will be more strongly reflected which allows shortening of the fibre 5 and thus reducing latency of the signal of L3 with respect to L1. Depending on the power of L2, and thus the efficiency of the grating, the fibre 5 may be between tens of metres to several kilometres in length.

Output beam L3 is received by photodiode 9 (optionally being amplified beforehand by a further amplifier such as a EDFA or equivalent) which outputs a corresponding electrical signal. The beat in the output of the photodiode 9 is detected by ADC 10. In some embodiments an amplifier may be positioned to amplify the output from photodiode 9 inputted to ADC 10. The output of the ADC may be fed to a digital EW system for analysis.

It will be appreciated that the detuned modulator 12 may be biased other than at 7E, so long as the fundamental: distortion products ratio of the modulated second beam L2 is less than the modulated first beam L1.

Rather than using a detuned modulator 12, a directly modulated laser may be used at low frequency (less than ~10 GHz). This arrangement can naturally produce large distortion products. Where a directly modulated laser is used, it should of the same wavelength as laser 1 and have a line width that is the same or greater than laser 1.

It may be possible to dispense with the amplifier 14 if L2 is already sufficiently powerful.

The paths of the counter propagating beams should be arranged so that the counter propagating beams pass through the fibre 5 at the same time in order to create the grating. This requires making the optical path lengths substantially the same taking into account and delays caused by optical components and/or the laser's 1 pulse length.

Figure 3:
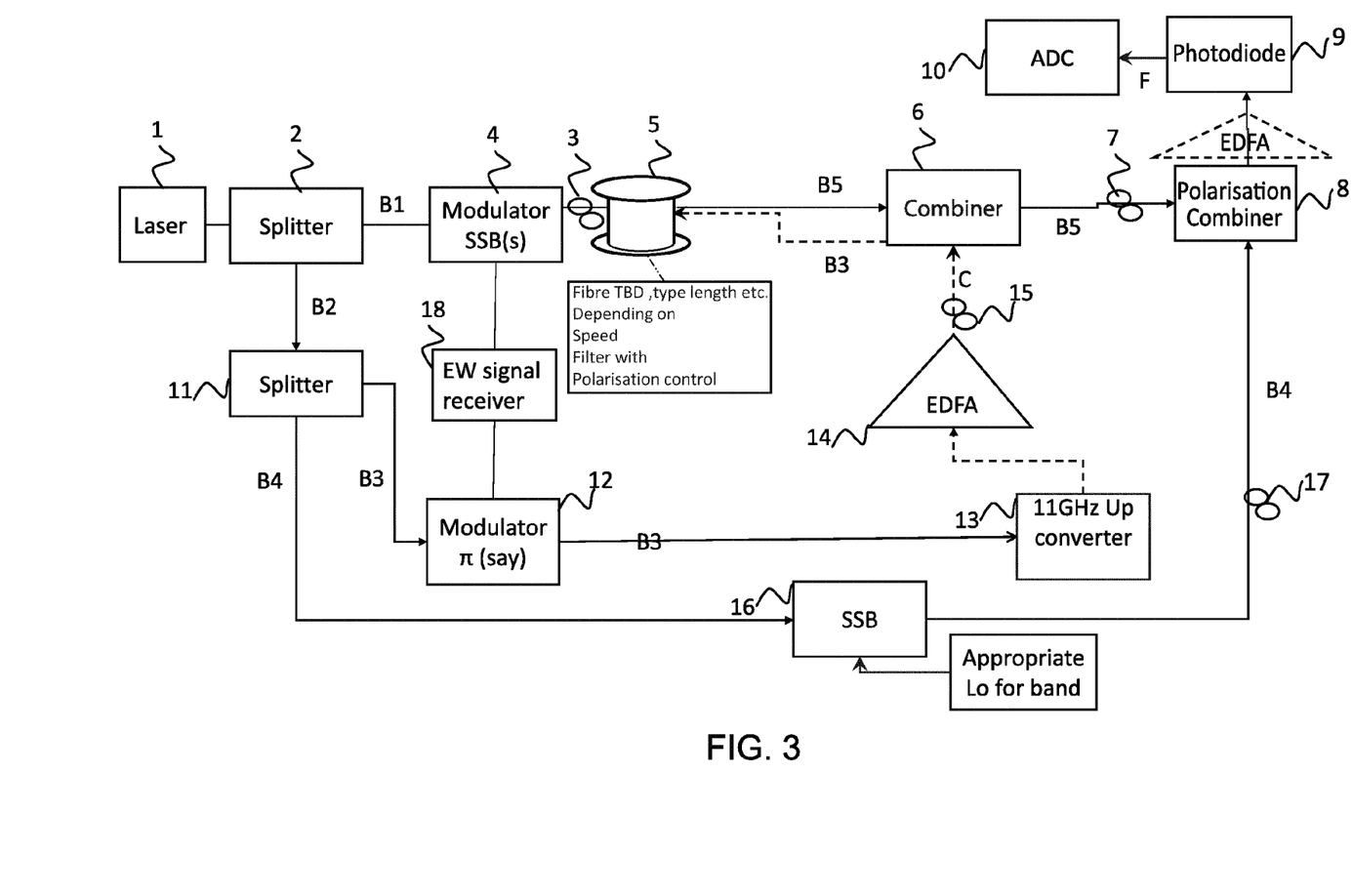
FIG. 3 is a schematic of a further variant wide band RF photonic receiver.

FIG. 3 is a schematic of a variant EW RF receiver and optical linkage that utilises the distortion removal apparatus of FIG. 1 and provides photonic mixing. Parts shared with the embodiment of FIG. 2 are given like numbering.

There is shown a laser 1, typically a distributed feedback laser, a first splitter 2, a polarisation controller 3, a single sideband carrier suppressed (SSB(C)) modulator 4, an optical medium 5 (typically a length of optical fibre—e.g. single mode fibre) in which a stimulated Brillion dynamic grating is formed; an optical combiner 6, a second polarisation control 7, a polarisation combiner 8, a high frequency photodiode 9, analogue digital converter 10 having an output to a digital EW system; a second optical splitter 11, a detuned modulator 12; a photonic upconverter 13 tuned to upconvert an input by an anti-stokes frequency; an optical amplifier (e.g. a EDFA); and a third polarisation controller 15.

The apparatus further comprises a tuned carrier suppressed SSB converter 16 with appropriate local oscillator and a fourth polarisation controller 17.

The apparatus further includes an EW receiver 18 comprising a RF antenna and amplifier that drives the SSB(C) modulator 4 and detuned modulator 12.

The laser 1 generates a coherent light beam, e.g. of a near-IR frequency, that is split by first splitter 2 into a first light beam B1 and a second light beam B2. The second light beams B2 is further split into a third light beam B3 and fourth light beam B4.

The first light beam B1 is modulated by the SSB(C) modulator 4 and the third light beam B3 is modulated by the detuned modulator 12 such that both the first and third light beams B1 B3 carry EW signals fed from receiver 18.

The detuned modulator 12 could be a standard Mach Zehnder modulator (though other modulators could be used) biased at 7E such that the ratio of the amplitude of the fundamental:amplitude of largest distortion products in B3 is lower than the ratio of the amplitude of the fundamental: amplitude of largest distortion products in B1. The amplitude of the distortion products in B3 may still be smaller than the amplitude of the fundamental (though larger than the fundamental would be preferable).

Modulated third beam B3 is up converted by the antistokes frequency and amplified by optical amplifier 14.

The first beam B1 and third beam B3 are transmitted through optical fibre 5 in opposition to one another. The third beam B3 is of sufficient power as to form a Brillouin grating within the optical fibre 5.

Polarisation controllers 3 and 15 are used to control the polarisation of B1 and B3 respectively such that Brillion grating occurs within the fibre 5 at the correct orientation to provide the desired reflection of B1.

As before, because the ratio of the amplitude of the fundamental:distortion products in B3 is lower than the ratio of the amplitude of the fundamental:distortion products in B1, the grating preferentially reflects the distortion products over the fundamental meaning that output beam B5 that has transmitted through grating in fibre 5 has a greater ratio of fundamental:distortion product than B1.

The optical power of B3 is preferably selected to ensure distortion products are suppressed down to below the noise floor.

Fourth beam B4 is frequency converted by tuned carrier suppressed SSB converter 16 by a frequency using a local oscillator tuned to be shifted from a frequency of interest; the size of the shift being within the resolution bandwidth of the ADC 10.

Up converted fourth beam B4, and output beam B5 are combined in polarisation combiner 8 and the output (optionally amplified by a further amplifier) fed to photodiode 9. Combined beams B4 B5 generate a beat in the output of the photodiode 9 that is within the resolution bandwidth of ADC 10. In some embodiments an amplifier may be positioned to amply the output from photodiode for input to ADC. The output of the ADC may be fed to a digital EW system for analysis.

Polarisation controllers 7 and 17 are used to control the polarisation of L5 and L4 into the polarisation combiner 8 to provide efficient combination. The arrangement of which will be familiar to those skilled in the art.

It will be appreciated that the detuned modulator L2 may be biased elsewhere so long as the fundamental:distortion products ratio is less than in L1. Again, a directly modulated laser may be used instead of a detuned modulator 12.

Rather than using SSB converter 16 it may be possible instead to redirect Brillouin scattered light from the stimulated emission in the waveguide, e.g. by using a suitable optical fibre.

Amplifier 14 may be dispensed with if B3 is sufficiently powerful.

The embodiments described above may optionally include a further optical amplifier (not shown) positioned in front of the photodiode to amplify the optical signal.

Figure 4:
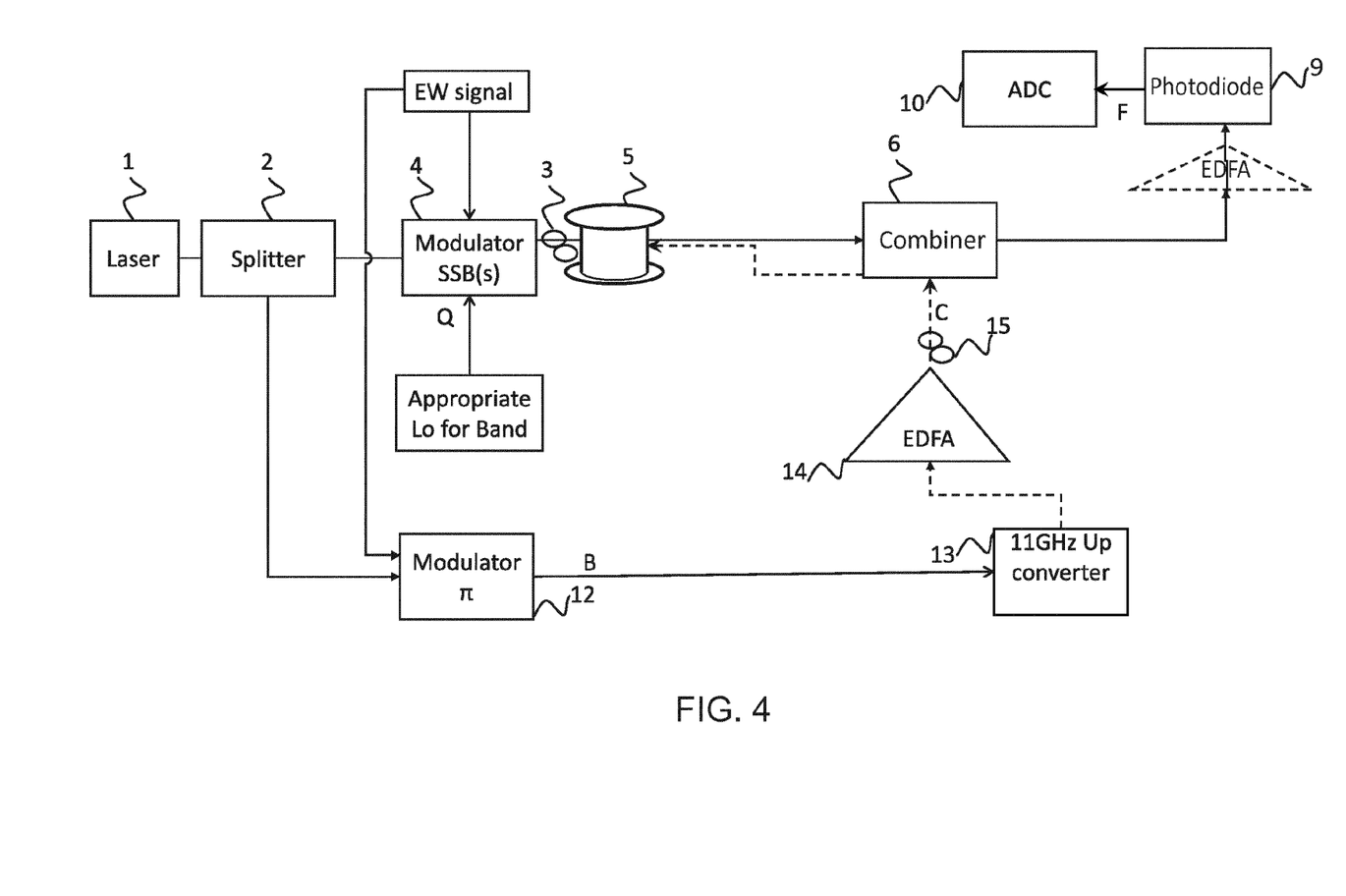
FIG. 4 is a schematic of a variant to the wide band RF photonic receiver of FIG. 2.

FIG. 4 is a variant of FIG. 2 in which the output of the lo is fed into an I channel of the modulator 4 and the output of the receiver 18 is fed into a Q channel of the modulator 4. This allows the RF coupler of FIG. 2 to be omitted. For further details of this implementation see Erwin H. W. Chan and Robert A. Minasian, "High conversion efficiency microwave photonic mixer based on stimulated Brillouin scattering carrier suppression technique," Opt. Lett. 38, 5292-5295 (2013).

Figure 5:
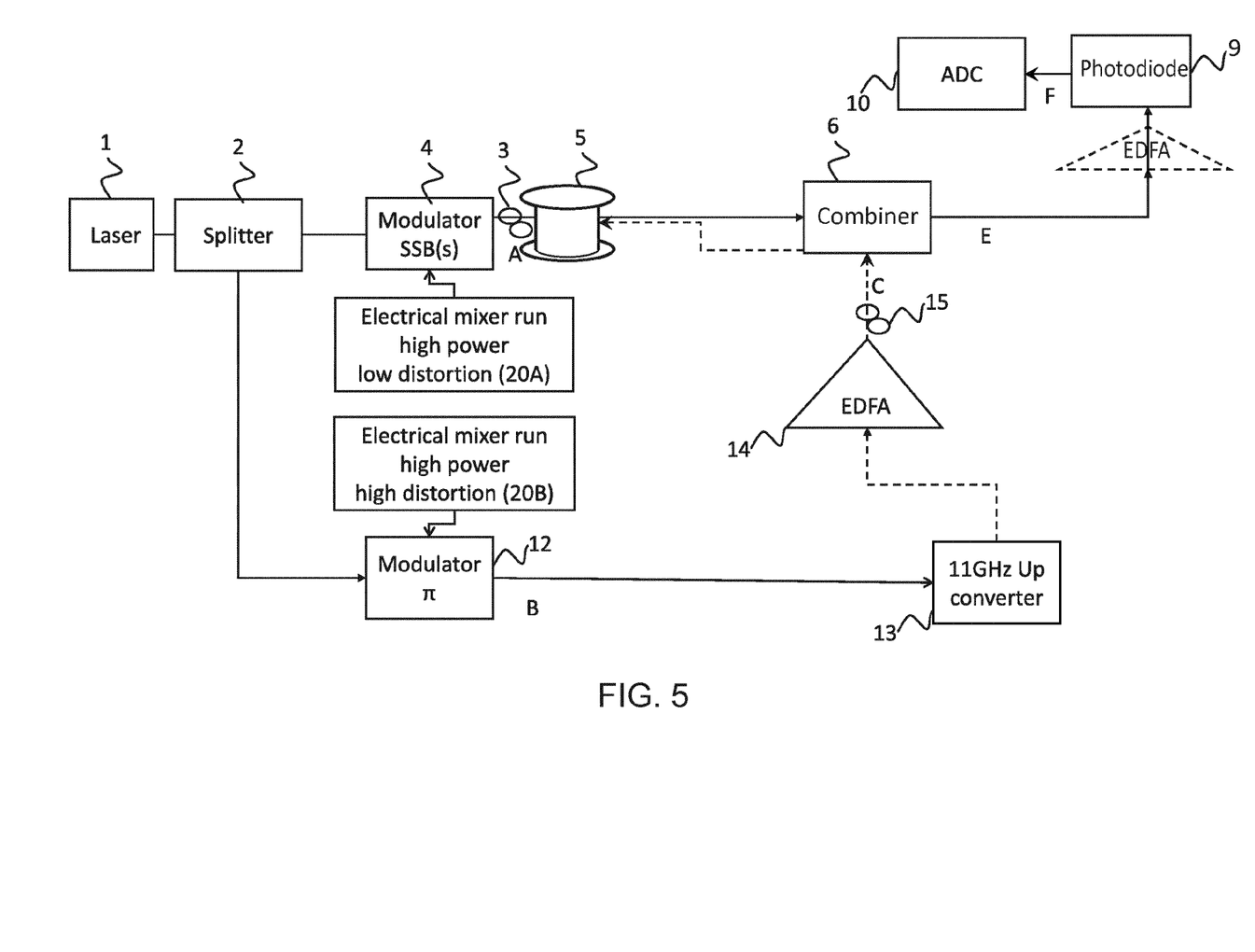
FIG. 5 is a schematic of a photonic link used to remove distortion from the output of an electrical mixer.

FIG. 5 illustrates application of the invention used to reduce distortion of the output of an electronic mixer.

The optical link has the same configuration as that of FIG. 2, with the difference that the first modulator 4 is arranged to modulate the first light beam to carry a signal using the output from a first electrical mixer 20A arranged to run at high power and low distortion. The second modulator 12 is arranged to modulate the second light beam to carry the signal using the output of a second mixer 20B configured to run at high power and create high distortion. In this way the beam output from modulator 12 will have a lower fundamental to distortion product ratio than the beam outputted from modulator 4 such that the dynamic Brillouin grating formed in fibre 5 will act to preferentially reflect (and thus suppress) distortion products from the output of modulator 4.

The optical link is conceived to have applications other than for connecting an RF receiver to processing system. For example, the optical link may be used to connect a RF transmitter to an antenna. In such an arrangement it may be favourable to up-convert the output from the grating before transmission to the antenna, e.g. using a electronic or photonic mixer. In such an arrangement the ADC could be dispensed with (as it could in any application were only an analogue output is required).

The optical link may also have use in commercial telecommunication applications such as with a RF transmitter and/or RF receiver forming part of a broadband cellular network.

The invention claimed is:

1. Apparatus for reducing distortion in an optical signal, the apparatus comprising:
   an optical waveguide;
   an input for receiving a signal;
   means for generating a first coherent light beam modulated to carry the signal received at the input,
   a means for generating a second coherent light beam modulated to carry the signal received at the input;
   wherein the optical frequencies of the first coherent light beam and second coherent light beam are selected to differ to satisfy a Brillouin condition; and wherein the first and second coherent light beams are selected to have different fundamental to distortion product ratios;
   the apparatus being arranged to cause the first coherent light beam to propagate along the optical waveguide in a first direction, and the second coherent light beam to propagate along the optical waveguide in an opposite direction to generate a dynamic Brillouin grating in the optical waveguide through stimulated Brillouin scattering.

2. Apparatus according to claim 1, wherein the second coherent light beam is selected to have a lower fundamental to distortion product ratio than the first coherent light beam.

3. Apparatus according to claim 2, wherein the means for generating the first coherent light beam comprises:
   a first optical modulator tuned so as to be of relatively high efficiency and relatively highly linear compared with the means for generating the modulated second coherent light beam, such that the first coherent light beam will have a relatively high fundamental to distortion product ratio compared with the second coherent light beam.

4. Apparatus according to claim 1, wherein the means for generating the first coherent light beam comprises:
   a single sideband (SSB) modulator.

5. Apparatus according to claim 1, wherein the means for generating a second coherent light beam comprises:
   a detuned modulator compared with the first modulator such that the second coherent light beam will have a relatively low fundamental to distortion product ratio relative to the first coherent light beam.

6. A radio receiver according to claim 5, wherein the detuned modulator is biased substantially at pi ($\pi$).

7. Apparatus according to claim 1, wherein the means for generating the second coherent light beam comprises:
   a single sideband (SSB) modulator.

8. Apparatus according to claim 1, comprising:
   means to shift the frequency of the second coherent light beam relative to the first optical beam to meet the Brillouin condition.

9. Apparatus according to claim 2, comprising:
an optical receiver arranged to receive a portion of the first coherent light beam that has passed through the dynamic Brillouin grating.

10. Apparatus according to claim 9, comprising:
an analogue-to-digital converter arranged to receive an output from the optical receiver.

11. Apparatus according to claim 9, comprising:
means for generating a third coherent light beam modulated with a frequency shifted from a frequency of interest by a beat frequency;
a photonic mixer arranged to combine an output optical signal that has passed through the Brillouin grating with the third coherent light beam, and wherein the optical receiver is arranged to receive the output from the photonic mixer in order to output an electrical signal carrying the beat frequency.

12. Apparatus according to claim 1, comprising:
an amplifier arranged and configured to amplify the modulated second coherent light beam before it is propagated through the optical waveguide.

13. Apparatus according to claim 12, wherein the amplifier is arranged and configured to amplify the modulated second coherent light beam to a power to cause the grating to scatter optical distortion products of the first coherent light beam to a sufficient extent that said distortion in a portion of the light beam that has passed through the Brillouin grating will be below the noise floor.

14. A radio receiver system including:
a radio frequency receiver and an optical link, the optical link comprising:
an optical waveguide;
an input for receiving a signal from the radio frequency receiver;
means for generating a first coherent light beam modulated to carry a signal received at the input;
a means for generating a second coherent light beam modulated to carry the signal received at the input;
wherein the optical frequencies of the first coherent light beam and second coherent light beam are selected to differ to satisfy the Brillouin condition; and wherein the first and second coherent light beams are selected to have different fundamental to distortion product ratios;
the apparatus being arranged such that the first coherent light beam propagates along the optical waveguide in a first direction and the second coherent light beam propagates along the optical waveguide in an opposite direction to generate a dynamic Brillouin grating in the optical waveguide through stimulated Brillouin scattering.

15. A method for reducing distortion in an optical signal, the method comprising:
modulating a first coherent light beam to carry a signal and propagating the modulated coherent light beam along an optical waveguide;
modulating a second coherent light beam to carry the signal and propagating the modulated coherent light beam along an optical waveguide; and
generating a dynamic Brillouin grating in the optical waveguide using stimulated Brillouin scattering by propagating the second coherent light beam through the optical waveguide in an opposite direction to the first coherent light beam;
wherein the first and second coherent light beams are modulated so as to have different fundamental to distortion product ratios.

16. A method according to claim 15, wherein the second coherent light beam is modulated to have a lower fundamental to distortion product ratio than the first coherent light beam, and wherein an optical-electro transducer is arranged to receive a portion of the first coherent light beam that has passed through the Brillouin grating.

17. A method according to claim 15, wherein the second coherent light beam is modulated by a detuned optical modulator.

18. A method according to claim 17, wherein the second coherent light beam is modulated by an optical modulator detuned substantially to $\pi$.

19. A method according to claim 15, comprising:
upconverting the second coherent light beam by a frequency substantially equal to an anti-stokes shift for Brillouin scattering.

20. A method according to claim 15, comprising:
amplifying the modulated second coherent light beam before being propagated through the optical waveguide.

21. A method according to claim 15, comprising:
amplifying the modulated second coherent light beam to a power such that distortion products caused from optical distortion are below a noise floor.

22. A method according to claim 15, wherein the first coherent light beam is modulated by a single sideband (SSB) modulator.

23. A method according to claim 15, comprising:
splitting a coherent light beam to create the first and second coherent light beams.

24. A method according to claim 15, wherein an analogue to digital converter is arranged to receive an output of the optical-electro transducer.

25. A method according to claim 24, comprising:
modulating a third light beam so as to impose thereon a frequency that is spaced from a frequency of interest by a separation frequency that lies within a operational bandwidth of the analogue to digital converter, the third light beam being mixed with a portion of the first coherent light beam that has passed through the Brillion grating to form a mixed beam that is received by the optical-electro transducer.

26. A method for reducing distortion in an optical signal of a photonic link connected to a RF receiver or RF transmitter, the method comprising:
modulating a first coherent light beam to carry a signal received by the RF receiver or transmitted by the RF transmitter, and propagating the modulated first coherent light beam along an optical waveguide;
modulating a second coherent light beam to carry the signal received by the RF receiver or transmitted by the RF transmitter and propagating the modulated second coherent light beam along an optical waveguide; and
generating a dynamic Brillouin grating in the optical waveguide using stimulated Brillouin scattering by propagating the second coherent light beam through the optical waveguide in an opposite direction to the first coherent light beam;
wherein an optical frequency of the first coherent light beam and second coherent light beam are selected to differ by an amount to satisfy a Brillouin condition;
and wherein the first and second coherent light beams are modulated so as to have different fundamental to distortion product ratios.

* * * * *